T. & E. G. WHITTED.
RAKE.
APPLICATION FILED SEPT. 10, 1912.
1,078,231. Patented Nov. 11, 1913.
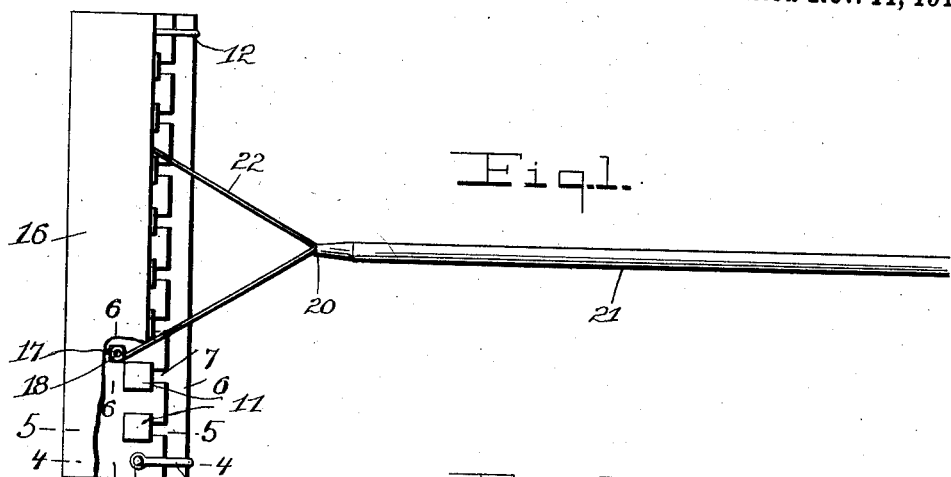
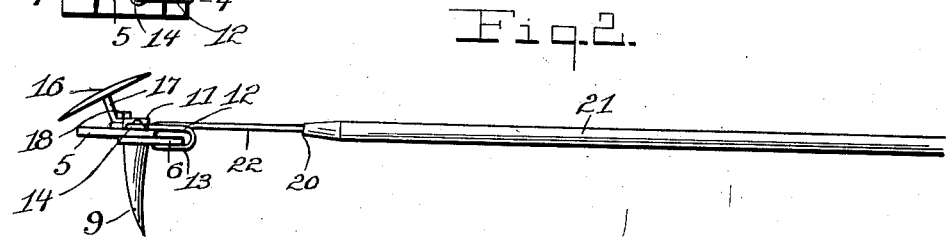
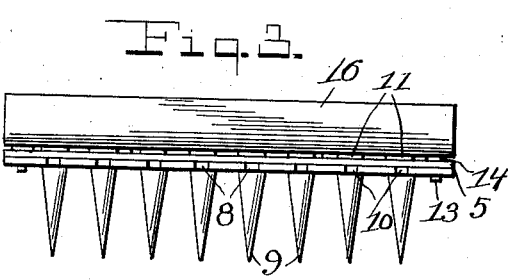
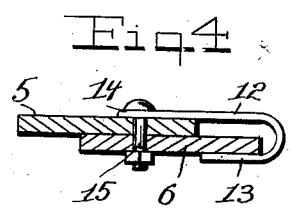
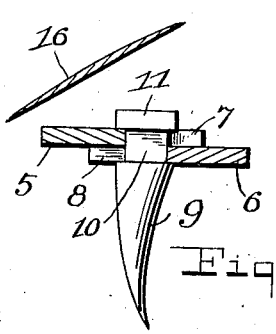
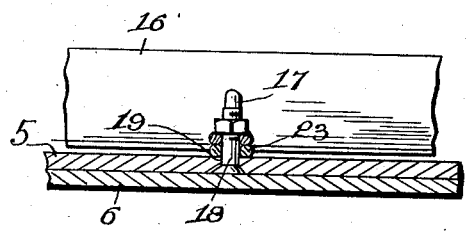
Witnesses
R. N. Jones.
Frank S. Ratcliffe.
Inventors
T. Whitted
E. G. Whitted.
By 
Attorney
COLUMBIA PLANOGRAPH CO., WASHINGTON, D. C.

UNITED STATES PATENT OFFICE.

THOMAS WHITTED AND EDDIE GREAN WHITTED, OF NARCOOSSEE, FLORIDA.

RAKE.

1,078,231.   Specification of Letters Patent.   Patented Nov. 11, 1913.

Application filed September 10, 1912.   Serial No. 719,609.

*To all whom it may concern:*

Be it known that we, THOMAS WHITTED and EDDIE GREAN WHITTED, citizens of the United States, residing at Narcoossee, in the county of Osceola, State of Florida, have invented certain new and useful Improvements in Rakes; and we do hereby declare the following to be a full, clear, and exact description of the invention, such as will enable others skilled in the art to which it appertains to make and use the same.

This invention relates to new and useful improvements in rakes, and particularly to that class which has combined therewith another implement such as a scuffle hoe.

The object of this invention lies in the provision of a rake in combination with a scuffle hoe, thus having one tool perform the functions of two, and obviating the necessity of carrying the extra tool, also making it possible for a person to hoe around trees or plants and at the same time rake the grass away.

A further object of the invention is to provide a rake wherein novel means are provided for holding the teeth interchangeably and thus providing for the replacing of the broken teeth.

With these and other objects in view, this invention resides in the novel features of construction, formation, combination and arrangements of parts to be hereinafter more fully described, claimed and illustrated in the accompanying drawing, in which:—

Figure 1 is a top plan view of our improved rake and scuffle hoe. Fig. 2 is a side elevation. Fig. 3 is an end view of the device. Fig. 4 is a sectional view on the line 4—4 of Fig. 1. Fig. 5 is a sectional view on the line 5—5 of Fig. 1. Fig. 6 is a sectional view on the line 6—6 of Fig. 1.

Referring to the drawings, there is shown a preferred embodiment of this invention. The rake head comprises plates 5 and 6, which are disposed in overlapping relation. The upper plate 5 is formed upon one side thereof with a plurality of spaced squared recesses 7, while the plate 6 has a plurality of similar recesses 8. Rake teeth 9 are provided with squared shanks 10 having enlarged heads 11. It will be seen that the recesses 7 and 8 coact to form a plurality of sockets for receiving the shank portions of the rake teeth 9. Means is thus provided for interchangeably holding the rake teeth 9 in the rake head. For holding the plates 5 and 6 in relative position, a plurality of clips 12 are provided, each having formed at one end the hook 13 and at the other end an eye 14. The hook 13 engages over the plate 6, while the eye 14 is disposed over the plate 5 and receives the bolt 15 which passes through alined openings in the plates.

A hoe 16 is provided, having attaching arms 17 which are secured to the plate 5 by means of bolts 18 passed through openings 19 therein.

The handle comprises a socket member 20 and the usual stock 21. The socket member 20 has a forked shank 22 at the extremities of which are provided eyes 23, through which the bolts 18, which also secure the arms 17, are passed.

It will thus be seen that a very simple and efficient device is provided which effectively combines the function of both rake and hoe.

What is claimed is:—

1. A rake comprising a pair of holding plates, each being provided on one side edge with a plurality of spaced recesses, a plurality of rake teeth each having a reduced shank and an enlarged head, the plates being disposed in lapped relation so that the recesses coact to form sockets for the shanks of the teeth, means for holding the plates in relation and a handle secured to the plates.

2. A rake comprising a pair of holding plates, each being provided on one side with a plurality of spaced squared recesses, a plurality of rake teeth, each having a squared shank and an enlarged head, the plates being disposed in lapped relation so that the recesses coact to form square sockets for the shanks of the teeth, clips each having a hook at one end engaging over the side edges of the plates, and an attaching eye at the other end, securing means passed through the eye and through the plates, and a handle secured to the plates.

In testimony whereof, we affix our signatures, in presence of two witnesses.

THOMAS WHITTED.
EDDIE GREAN WHITTED.

Witnesses:
 FREDK. W. HILL,
 F. W. S. HILL.

Copies of this patent may be obtained for five cents each, by addressing the "Commissioner of Patents Washington, D. C."